June 8, 1937.   F. A. THAU   2,082,856
BRAKE SHOE
Filed Dec. 10, 1936
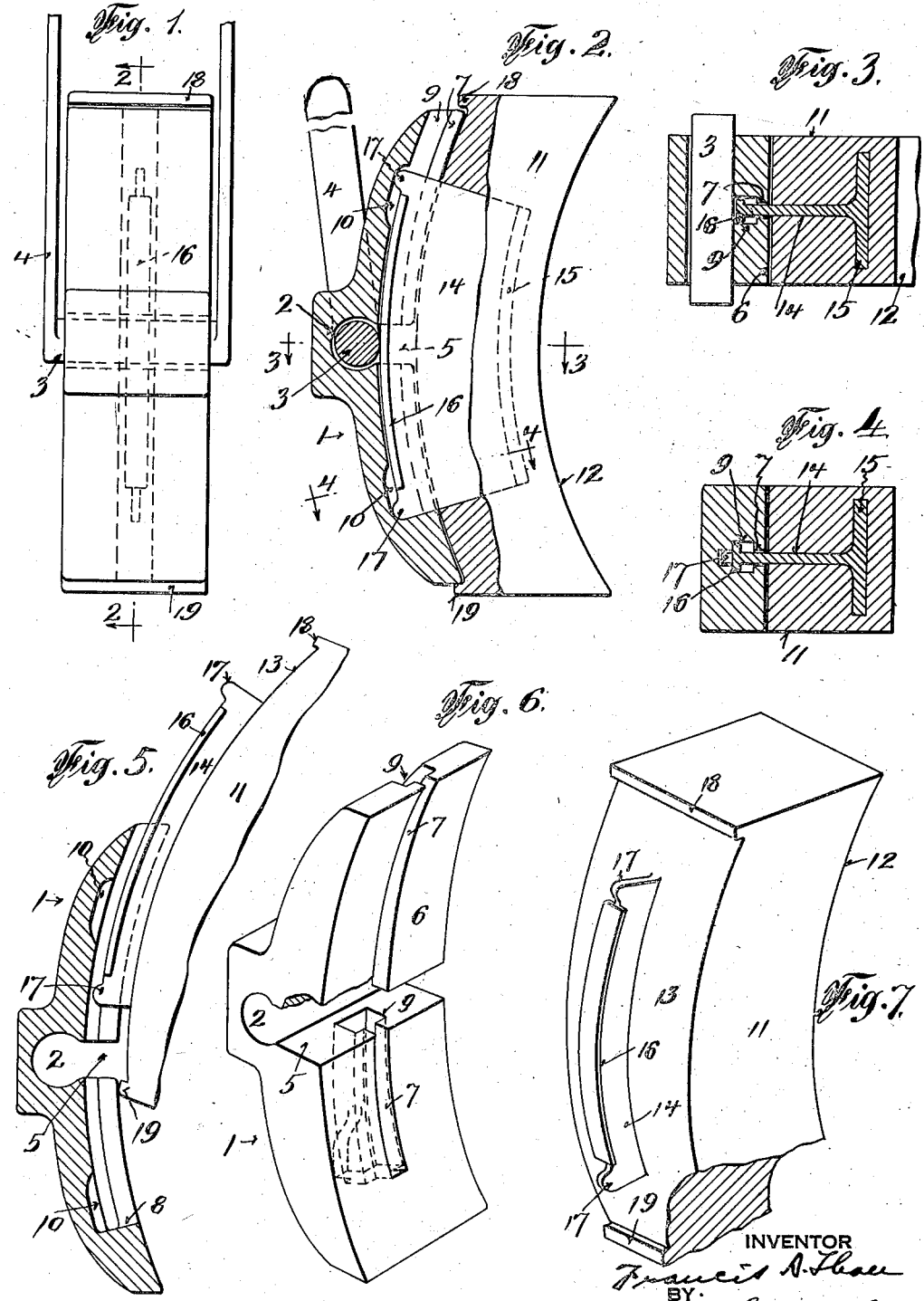

Patented June 8, 1937

2,082,856

UNITED STATES PATENT OFFICE 2,082,856

BRAKE SHOE

Francis A. Thau, Jersey City, N. J.

Application December 10, 1936, Serial No. 115,082

6 Claims. (Cl. 188—244)

My invention relates to a novel brake shoe and brake head for carrying the same, and there are two main objects in the invention. One object is to reinforce the cast brake shoe by means of a steel member around which the iron in the shoe is cast so that they form a unitary body. The steel reinforcing member is of angle form so that the shoe will not fracture or break. In railway practice it is a common thing for brake shoes to fracture, especially near the middle, and especially after they have been worn down somewhat; and this leaves the particular car to which the shoe is applied without sufficient braking action, but the most serious result is that the brake shoe sometimes falls on the track and causes derailment.

There is also a substantial loss in the operation of rolling stock caused by the breaking of shoes. It is one of the objects of my invention to eliminate breakage of the shoes to avoid the difficulties mentioned, by reinforcing the cast iron shoe with a more efficient steel reinforcing member than any heretofore used.

Another main object of my invention is to provide a brake shoe and brake head in which the brake shoe may be quickly attached to and detached from the brake head and one in which the brake shoe will not become loose or turn on the brake head.

Another object is to eliminate the necessity of using a removable key for holding the brake shoe on the brake head. Keys have been almost universally used for holding the brake shoe on the brake head and these keys become worn as the brake shoe wears down, so that they break off and thus destroy the connection of the brake shoe with the brake head. These keys also lose their springiness and therefore lose their efficiency.

Furthermore, the keys often shake out of the brake shoe and brake head, thus allowing the brake shoe to detach from the brake head, with the result that the brake shoe is lost and there is always the likelihood of the brake beam detaching from the brake head and falling on the track and causing derailment of the car.

In the present device I eliminate entirely the necessity of using a key or any other loose or detachable member for securing the brake shoe to the brake head.

Another object of my invention is to make a device in which the brake shoe is reversible end to end so that if the shoe wears unevenly it may be reversed in position.

Other features and advantages will be set forth in the following detailed description of my invention.

In the drawing forming part of this application,

Figure 1 is a front elevation of a brake head, a brake shoe, and a portion of a hanger, showing my invention, Figure 2 is a sectional view broken substantially on the line 2—2 of Figure 1, Figure 3 is a sectional view taken on the line 3—3 of Figure 2, Figure 4 is a sectional view taken on the line 4—4 of Figure 2, Figure 5 is an elevation of a brake shoe and brake head with a portion of the brake head broken away and showing the brake shoe being slid into position on the brake head, Figure 6 is a perspective view of the brake head, and Figure 7 is a perspective view of the brake shoe with a portion broken away.

In the drawing I have shown a brake head 1 which is of curved arcuate shape, conforming substantially with the curvature of the wheel to which the device is applied. This brake head is shown as having an opening 2 extending laterally therethrough to receive the cross bar 3 of the link or hanger 4 which is to support the brake head from a brake beam in the ordinary manner. This brake head preferably has an open slot 5 extending from the inner face 6 and opening into the aperture 2 to permit the cross bar 3 of the hanger to be inserted into the aperture 2.

The forward face 6 of the brake head is formed arcuate in shape and preferably concentric with the periphery of the wheel to which the device is to be attached, the wheel being omitted from the drawing. Preferably at the middle of the arcuate face 6 there is a slot 7 extending inwardly of the brake head, this slot extending to the extreme top end of the brake head, but at its lower end 8 it terminates at a point above the bottom edge of the brake head so that the upper end of the slot is open while the lower end is closed. This slot communicates with or opens into a larger slot 9 which is coextensive with the front slot 7 in length and the two slots combined make a substantially T shaped opening to receive certain parts of the brake shoe as will be set forth hereinafter.

At the bottom of the slot 9 I provide sub-recesses 10 which need not extend the full length of the slot 9 but only short distances, and these sub-recesses are preferably disposed equal distances from the top and bottom ends of the brake head for a purpose which will appear hereinafter.

The brake shoe includes a body of metal 11 having its forward or wearing surface 12 curved on an arc concentric with the wheel to which the device is to be attached; and this is the surface which is subjected to wear against the periphery of the wheel. Preferably, the rear surface 13 of the brake shoe is also curved on an arc concentric with the periphery of the wheel and parallel with the forward, curved face 6 of the brake head so that the brake shoe may lie with its rear face against the forward face of the brake head as shown in Figure 2 when the parts are assembled.

Preferably, the steel member which forms a reinforcement for the brake shoe projects from the brake shoe and forms a locking member to co-operate with the brake head. For this purpose I preferably employ an angle metal member consisting of a vertical web 14 which extends laterally in the brake shoe 11 and from which extends at right angles a web 15 which is embedded in the metal of the brake shoe and which extends substantially parallel with the wearing face 12 of the brake shoe.

Preferably, the steel reinforcing member is arched in the direction of its length as shown in Figure 2, in order to conform with the curvature of the brake shoe and the brake head. This steel reinforcing member is embedded in and becomes a part of the brake shoe and for this reason the iron body 11 forming the major part of the brake shoe is cast around the metal member 14, 15 so that they form a solid unit.

One portion of the vertical wall 14 of the reinforcing member projects at the rear side of the brake shoe and spaced from the brake shoe it carries a laterally extending flange 16 which is adapted to travel in the slot 9 when the brake shoe is being applied to the brake head and to remain in this groove while the brake shoe is assembled on the brake head.

Preferably, adjacent each end of the locking flange 16 I provide the two projections 17 which extend rearwardly beyond the locking flange 16 and which projections are adapted to seat in the sub-grooves 10 as will be hereinafter pointed out.

Preferably, at the upper and lower ends of the brake shoe and adjacent the curved rear surface 13 I provide integral lips 18, 19 extending rearwardly from the brake shoe for engaging the top and bottom edges of the brake head to prevent the brake shoe from following the wheel in either direction when the brake is applied.

Operation

In applying the brake shoe to the brake head the parts will be brought to the position where the lower end of the brake shoe will be adjacent the upper end of the brake head and the end of the locking flange 16 will be inserted into the upper, open end of the slot 9 in the brake head with the vertical wall 14 of the locking member entering the slot 7 of the brake head at its upper, open end. The brake shoe will then be moved downwardly in relation to the brake head with the flange 16 travelling in the slot 9 and the vertical wall 14 travelling in the slot 7.

This movement will be continued until the parts come to the positions shown in Figure 2, at which time the brake shoe may be moved backwardly toward the brake head to bring its rear, curved surface 13 into contact with the forward curved surface 6 of the brake head and when this occurs the flanges 18, 19 at the top and bottom of the brake shoe will overlap the top and bottom edges of the brake head.

Also, at this time, the two projections 17 will enter the sub-grooves 10. The brake shoe will now be locked onto the brake head and the brake shoe cannot be moved downwardly any further because the reinforcing member, and particularly the wall 14 thereof, rests against the bottom 8 of the groove 7 of the brake head and the upper flange 18 rests against the upper end of the brake head thus preventing the brake shoe from moving downwardly in relation to the brake head.

The brake shoe cannot move upwardly in relation to the brake head while the shoe is pressed against the wheel because the lower flange 19 of the brake shoe engages the lower end of the brake head and because the projections 17 lie in the sub-grooves 10 and prevent the brake shoe from rising in relation to the brake head.

It will be understood that except for this locking arrangement the brake shoe might rise because of vibrations and when the wheel revolves clockwise in relation to the device as used in Figure 2 the brake shoe has a tendency to follow the wheel but this is resisted by the locking means just described.

The brake shoe can move forwardly in relation to the brake head a slight extent because the locking flange 16 does not fill the groove 9 as will be seen from Figures 2 and 5, but the wheel cannot pull the brake shoe upwardly or downwardly in relation to the brake head because whenever the brake is applied the brake shoe is locked to the brake head in the manner described above.

It will be noted that the locking arrangement described herein is effective without the use of any key or other detachable or removable locking member. It will also be apparent that the locking portions of the present device are very substantial and are not subject to breakage.

To remove the brake shoe from the brake head it is only necessary to move the brake shoe forwardly in relation to the brake head a slight distance so that the flange 16 moves to the forward portion of the groove 9 and this will withdraw the projections 17 from the sub-grooves 10 whereupon the brake shoe may be raised until it is entirely detached from the brake head. During this last described upward movement of the brake shoe the projections 17 are not only withdrawn from the sub-grooves 10 but the locking flange 16 rides against the forward side of the groove 9 and the vertical wall 14 of the reinforcing member travels in the slot 7 until the brake shoe has been lifted above the brake head. The slight forward movement of the brake shoe described above not only removes the projections 17 from the sub-grooves 10 to allow the brake shoe to be moved upwardly, but it also permits the lower flange 19 to disengage from the lower end of the brake head and thus allow the brake shoe to be lifted in relation to the brake head.

The brake shoe is reversible so that if the wear upon its front surface is uneven the brake shoe may be reversed end to end. For instance, after the shoe has been in use in the position shown in Figure 2, if the forward face shows an unevenness of wear, that is to say, if the upper end of the shoe becomes thinner than the lower end, or vice versa, the shoe may be removed from the brake head and then turned around end to end and reapplied to the brake head so that the end which is first in the uppermost position in Figure 2 will then be in the lower position. Where the sub grooves 10 are disposed equal distances from opposite ends of the brake head and the projections 17 are equal distances from the opposite ends of the brake shoe, it will be obvious that the brake shoe may be reversed in the manner described and that the locking devices will be effective in either of the reversed positions of the brake shoe.

The locking members are neither movable nor removable in the present device, nor are they in a position where they are subject to any wear by the wheel. On the other hand they are effective until the brake shoe is completely worn out.

The reinforcing member incorporated partly in the brake shoe is of angular formation and it is therefore very strong and will protect the main body of the brake shoe, which is ordinarily made of cast iron, from fracturing. Even if the brake shoe wears down to an extent which wears away the web 15 of the reinforcing member the vertical web 14 of the reinforcing member will continue to protect the brake shoe against fracture. Usually, brake shoes fracture near the middle. With the present device fracturing of the brake shoe will be effectively eliminated, but even if the present shoe should for any reason fracture at the middle the two parts will continue to be held in locking engagement with the brake head. However, breakage of the brake shoe in the present case will be practically eliminated entirely.

From the above it will be apparent that I have provided a brake shoe and brake head wherein the brake shoe may be quickly detached from or applied to the brake head and wherein substantial and immovable locking elements retain the brake shoe in locking engagement with the brake head against detachment by reason of vibration or by reason of the pull of the wheel and that a detachable or movable locking key is eliminated from the construction.

Having described my invention, what I claim is:

1. A brake shoe device comprising a brake shoe having a locking member projecting therefrom and provided with a locking flange, a brake head having a T shaped slot to receive endwise therein the locking member of said brake shoe, said locking member having one or more projections and said brake head having one or more recesses to receive said projection or projections therein to lock the brake shoe against endwise disengagement from said brake head, said parts being so designed that the said locking member may have a limited front and back movement in relation to the brake head to permit said projections to engage in and disengage from said recesses.

2. A brake shoe device comprising a brake shoe having a locking member projecting therefrom and provided with a locking flange, a brake head having a T shaped slot having an open upper end and a closed lower end to receive endwise therein the locking member of said brake shoe, said locking member having one or more projections and said brake head having one or more recesses to receive said projection or projections therein to lock the brake shoe against endwise disengagement from said brake head, said parts being so designed that the locking member may have a limited front and back movement in relation to the brake head to permit said projection or projections to engage in and disengage from said recess or recesses.

3. A brake shoe device comprising a brake shoe having a locking member projecting therefrom and provided with a locking flange, a brake head having a T shaped slot open at the top and closed at the bottom, and adapted to receive endwise therein the locking member of said brake shoe and in which the locking member is reversible end to end in said slot, said locking member having one or more projections, and said brake head having one or more recesses to receive said projections therein to lock the brake shoe against endwise disengagement from said brake head, said parts being so designed that the locking member may have a limited front and back movement in relation to the brake head to permit said projection or projections to engage in and disengage from said recess or recesses.

4. A brake shoe device comprising a brake shoe having a locking member projecting therefrom and provided with a locking flange, a brake head having a T shaped slot open at the top and closed at the bottom to receive endwise therein the locking member of said brake shoe, said brake shoe and the locking member being reversible end to end in relation to the brake head, said locking member having a plurality of projections each arranged equidistant from opposite ends of the brake shoe and said brake head having one or more recesses to receive said projections therein to lock the brake shoe against endwise disengagement from said brake head, said parts being so designed that the said locking member may have a limited front and back movement in relation to the brake head to permit said projections to engage in and disengage from said recess or recesses.

5. A brake shoe device comprising a brake shoe consisting of a body of cast metal having incorporated therein a reinforcing member having a wall disposed at right angles to the face of the brake shoe and projecting rearwardly from the brake shoe, said projecting portion of the locking member having a locking flange, a brake head having a T shaped slot to receive endwise therein the flange of the locking member of said brake shoe, said locking member having one or more projections and said brake head having one or more recesses to receive said projection or projections therein to lock the brake shoe against endwise disengagement from said brake head, said parts being so designed that the locking member may have a limited front and back movement in relation to the brake head to permit said projections to engage in or disengage from said recess or recesses.

6. A brake shoe device comprising a brake shoe having a locking member projecting therefrom and provided with a locking flange, a brake head having a T shaped slot to receive endwise therein the locking member of said brake shoe, said locking member having a projection and said brake head having a recess to receive said projection therein to lock the brake shoe against endwise disengagement from said brake head, said parts being so designed that said locking member may have a limited front and back movement in relation to the brake head to permit said projection to engage in and disengage from said recess, said brake shoe having lips on opposite ends adapted to abut against opposite ends of the brake head.

FRANCIS A. THAU.